US009592998B2

(12) United States Patent
Pilgrim

(10) Patent No.: US 9,592,998 B2
(45) Date of Patent: Mar. 14, 2017

(54) APPARATUS FOR TRANSPORTING COMMERCIAL AND INDUSTRIAL APPLIANCE UNITS

(71) Applicant: John Robert Pilgrim, Stone Mountain, GA (US)

(72) Inventor: John Robert Pilgrim, Stone Mountain, GA (US)

( * ) Notice: Subject to any disclaimer, the term of this patent is extended or adjusted under 35 U.S.C. 154(b) by 0 days.

(21) Appl. No.: 14/086,403

(22) Filed: Nov. 21, 2013

(65) Prior Publication Data

US 2014/0140795 A1 May 22, 2014

Related U.S. Application Data

(60) Provisional application No. 61/729,168, filed on Nov. 21, 2012.

(51) Int. Cl.
*B60P 3/00* (2006.01)
*B66C 19/00* (2006.01)

(52) U.S. Cl.
CPC .................................. *B66C 19/005* (2013.01)

(58) Field of Classification Search
CPC B66C 19/02; B66C 1/16; B66C 23/48; B66C 19/005; Y10S 414/124; Y10S 212/901; B62B 3/04; B62B 2206/02
USPC .................................................. 414/459–461
See application file for complete search history.

(56) References Cited

U.S. PATENT DOCUMENTS

| | | | | |
|---|---|---|---|---|
| 2,702,139 | A * | 2/1955 | Faustine | 414/461 |
| 3,756,561 | A * | 9/1973 | Rendelman | 254/4 R |
| 3,831,791 | A * | 8/1974 | Gonzales | 414/461 |
| 4,275,982 | A * | 6/1981 | Fisco | 414/459 |
| 4,334,480 | A * | 6/1982 | Wallace | 104/126 |
| 5,988,597 | A * | 11/1999 | Egan | 254/279 |
| 7,320,453 | B2 * | 1/2008 | Berlyn et al. | 248/328 |
| 7,367,538 | B2 * | 5/2008 | Berlyn | 248/317 |
| 8,210,488 | B2 * | 7/2012 | Small | 248/346.01 |
| 2002/0071751 | A1 * | 6/2002 | Brice et al. | 414/458 |
| 2003/0091417 | A1 * | 5/2003 | Swann | 414/458 |
| 2003/0180132 | A1 * | 9/2003 | Morreim | 414/458 |

* cited by examiner

*Primary Examiner* — Michael McCullough
*Assistant Examiner* — Mark Hageman
(74) *Attorney, Agent, or Firm* — Thomas | Horstemeyer, LLP

(57) ABSTRACT

Disclosed are various embodiments of an apparatus for raising, suspending, transporting, and lowering appliance units for installation and removal. Two support frame assemblies, each having telescopic legs attached to wheels and upper support brackets from which the appliance unit is suspended, are connected by a removable frame connector. The apparatus may then be rolled across a rooftop to move and place the appliance unit. The frame connector may be replaced with a retention connector and supplemented with a lower retention connector for efficient storage and transport of the apparatus.

20 Claims, 5 Drawing Sheets

APPARATUS FOR TRANSPORTING COMMERCIAL AND INDUSTRIAL APPLIANCE UNITS

CROSS REFERENCE TO RELATED APPLICATIONS

This application claims priority to U.S. Provisional Patent Application titled "A-FRAME APPARATUS FOR TRANSPORTING COMMERCIAL AND INDUSTRIAL APPLIANCE UNITS" filed on Nov. 21, 2012 and assigned application No. 61/729,168, which is incorporated by reference herein in its entirety.

BACKGROUND

Various types of vehicles and devices—including cranes, helicopters, forklifts, dollies and carts—may be used to lift and transport objects, such as large HVAC-type appliances. Such vehicles and devices are commonly used for hoisting, moving and lowering such objects. However, large cranes and helicopters are often prohibitively expensive for use in installing commercial or industrial HVAC-type units or for the lengths of time required to lift and install multiple HVAC-type appliances. Moreover, large cranes and helicopters often require advanced scheduling and several crew members to operate. In addition, commercial and industrial roof-top HVAC-type units are typically very heavy, weighing hundreds to thousands of pounds. Thus, due to the significant weight of the units, there is often substantial risk when suspending a unit from a crane boom or helicopter rigging over a building for extended amounts of time or in high wind conditions. For instance, in the event of a rigging failure, the unit could fall onto the building roof and possibly through the roof into the building structure, thereby damaging the unit, damaging the building roof and substructure, and possibly injuring building occupants. Furthermore, many building roofs are not substantially strong enough or designed and built to support the weight of traditional heavy lifting equipment, such as a forklift, that could otherwise lift and place a massive commercial or industrial HVAC-type appliance on a flat-surface roof without the use of a crane or helicopter.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure generally relates to apparatus, devices, and systems for lifting, transporting, positioning and lowering heavy mechanical systems and appliances, such as, e.g., commercial and industrial heating, air conditioning, and ventilation ("HVAC") units for installation on building rooftops. More specifically, the present disclosure discloses an apparatus that can raise, suspend, transport, and lower appliance units that, because of their substantial weight, cannot be safely or cost-effectively picked up, lifted, and/or suspended over a flat-roofed commercial or industrial building by large cranes or helicopters.

Figure 1:
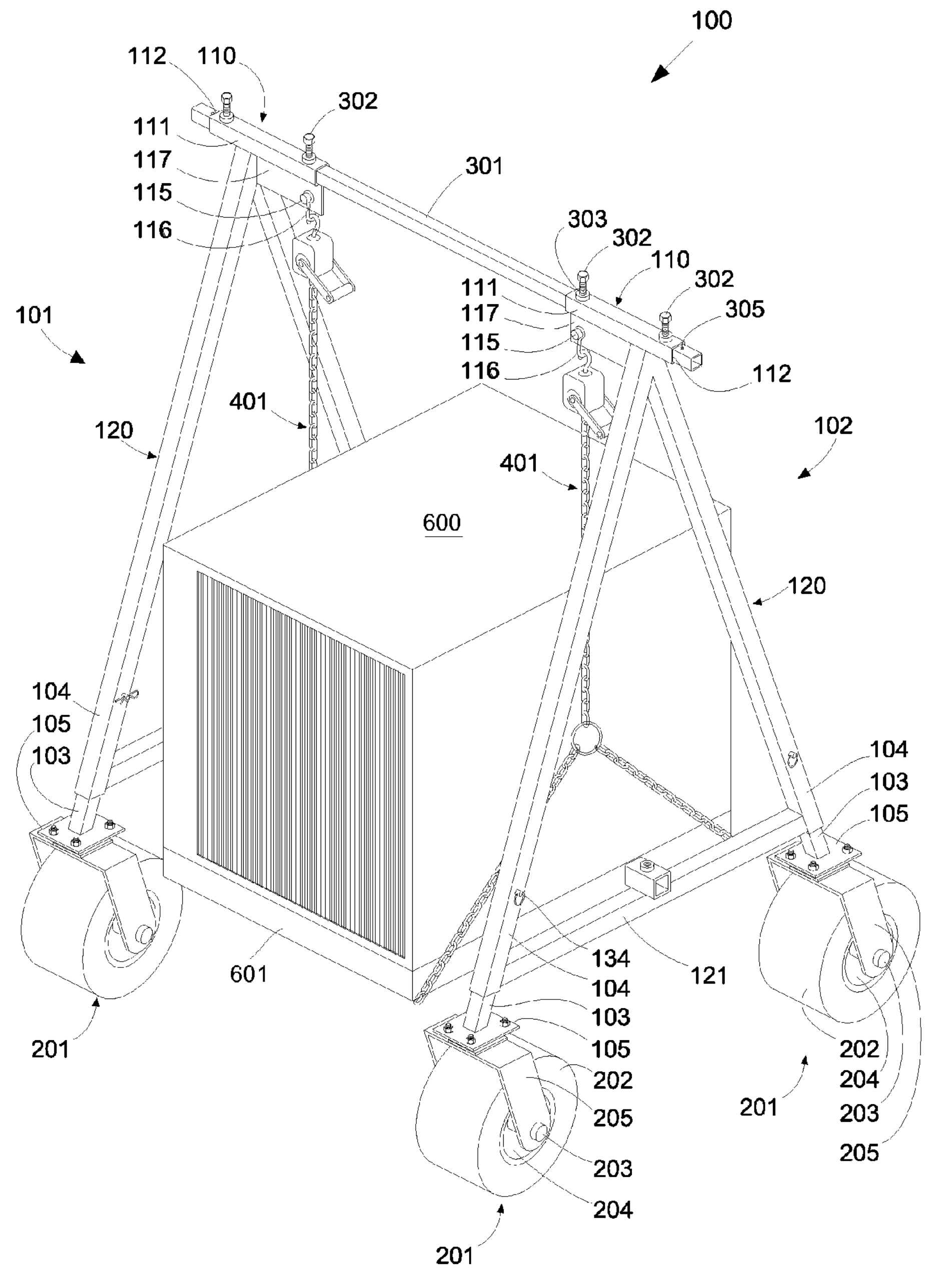
FIG. 1 is a perspective view of an example of an apparatus in an in-use configuration supporting a commercial or industrial appliance unit for transporting in accordance with various embodiments of the present disclosure.

In the following discussion, a general description of the embodiments of a suspension apparatus for transporting commercial and industrial appliance units is provided. With reference to FIG. 1, shown is a drawing of an example of a suspension apparatus 100 in an in-use configuration in accordance with various embodiments of the present disclosure. The suspension apparatus 100 is depicted with a commercial or industrial appliance unit 600 suspended from the suspension apparatus 100 to demonstrate the ability to transport the appliance unit 600.

As depicted in FIG. 1, the suspension apparatus 100 may comprise a first support frame 101 and at least a second support frame 102. Each support frame 101/102 may comprise a tube frame 120, an upper support bracket assembly 110, and two telescopic legs 103 contained within the lateral support posts 104 of each tube frame 120. As illustrated in FIG. 1, the tube frame 120 may comprise lateral support posts 104 and a base post 121. In some embodiments, each tube frame 120 may be approximately five to seven feet in height and approximately four feet wide at the base. In other embodiments, the tube frame 120 may comprise other dimensions. In addition, in some embodiments, the telescopic legs 103 may each be approximately four feet in length. As such, the suspension apparatus 100 may have an adjustable height up to approximately twelve feet. In other embodiments, the telescopic legs 103 may comprise other dimensions. While the tube frame 120, as illustrated in FIG. 1, is triangular in shape, it should be noted that the tube frame 120 may be rectangular, square, pentagonal, and/or any other appropriate type of shape. Additional cross bracing may be included for strength and stability.

Each upper support bracket assembly 110 may comprise an upper support bracket plate 117 and an upper support bracket sleeve 111. In some embodiments, the upper support bracket plate 117 may be approximately eight inches wide. In other embodiments, the upper support bracket plate 117 may comprise other widths. Each upper support bracket assembly 110 may be coupled to a respective tube frame 120 near a top end of the respective tube frame 120. In some embodiments, the upper support bracket assembly 110 may be secured to the tube frame 120 via welding, and/or other type of suitable bonding. A base plate 105 may be affixed to a lower terminus of each telescopic leg 103. A moveable wheel assembly 201 may be detachably attached to each base plate 105 in a manner that allows the wheel assembly 201 to swivel around the longitudinal axis of the respective telescopic leg 103 to which the wheel assembly 201 is attached. The wheel assembly 201 may be detachably attached to each base plate 105 with fastening device, such as, for example, a bolt, a screw, a pin, a cotter key, and/or any other appropriate type of fastening device. For example, a pin assembly (not shown) may be used to lock the wheel assemblies 201 for the first support frame 101 and the wheel assemblies 201 for the second support frame 102. In some embodiments, each wheel assembly 201 may comprise a tire 202, an axle 203, a wheel 204, and a wheel housing bracket 205.

The first support frame 101 and the second support frame 102 may be connected to each other via a frame connector 301. The frame connector 301 may vary in length according to the required or desired width of the suspension apparatus 100 to accommodate the width of appliance unit 600. In some embodiments, the frame connector 301 may be up to twenty feet in length. Additionally, in some embodiments, the frame connector 301 may be approximately two inches in width and approximately two inches in height. The frame connector 301 may be coupled to a top end of each of the first support frame 101 and the second support frame 102. Although the frame connector 301 as shown is FIG. 1 illustrates a bar, it should be noted that the frame connector 301 may comprise a plate, a bar, a rod, a pipe and/or other type of appropriate connecting means. In some embodiments, the frame connector 301 is coupled to the first support frame 101 and the second support frame 102 via the upper support bracket assembly 110 of the first support frame 101 and the upper support bracket assembly 110 of the second support frame 102. In some embodiments, a first end of the frame connector 301 may be inserted into the upper support bracket sleeve 111 of the upper support bracket assembly 110 of the first support frame 101. Additionally, a second end of the frame connector 301 may be inserted into the upper support bracket sleeve 111 of the upper support bracket assembly 110 of the second support frame 102. The frame connector 301 may extend through the upper support bracket sleeves 111 and protrude from an upper distal opening 112 on the opposite side of the upper support bracket sleeve 111.

The frame connector 301 may be secured within each upper support bracket sleeve 111 by one or more, upper fasteners 302 such as, for example, set screw type fasteners. The upper fasteners 302 may be inserted through upper holes 303 in top face 304 (FIG. 3) of upper support bracket assembly 110 and engage frame fastener receptacle ports 305 on top face of frame connector 301 to prevent the frame connector 301 from moving laterally during use of the suspension apparatus 100. In some embodiments, the frame connector 301 may be adjustably coupled to at least one of the first support frame 101 or the second support frame 102. For example, the frame connector may comprise multiple frame fastener receptacle ports 305 allowing the frame connector 301 to be secured to the first support frame 101 and the second support frame at varying positions. As such, a distance between the first support frame 101 and the second support frame 102 may be adjusted based on which frame fastener receptacle ports 305 are used to secure the frame connector 301 to the first support frame 101 and the second support frame 102.

The appliance unit 600 may be suspended from each upper support bracket assembly 110 by a suspension element 401, which in alternative embodiments may consist of, for example, chains, cable slings, nylon slings, come-along devices or any other appropriate type of suspension support or combinations thereof. The suspension element 401 is connected to the upper support bracket assembly 110 of the first support frame 101 and the second support frame 102 at connection ports, or "pick points," 115 on the upper support bracket assembly 110 by use of connectors 116, such as, for example, hooks, U-bolts or carriage bolts inserted through or connected to suspension connection ports 115 in the upper support bracket plate 117. In some embodiments, the suspension element 401 may be adjusted to raise and/or lower the appliance unit 600 about the suspension apparatus 100.

Figure 2:
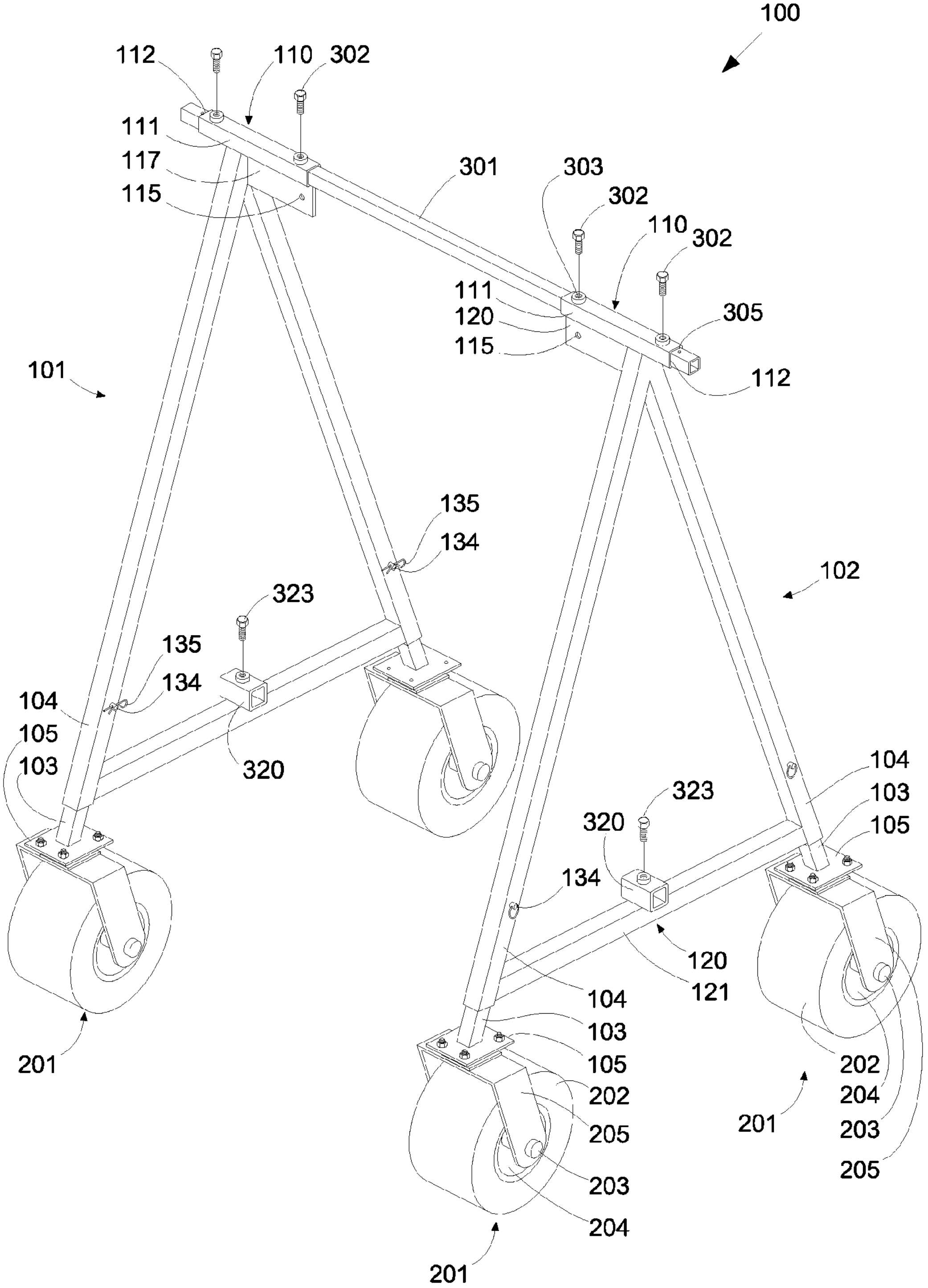
FIG. 2 is a perspective view of the apparatus of FIG. 1 without the appliance unit, in accordance with various embodiments of the present disclosure.

Referring next to FIG. 2, shown is a perspective view of an example of the suspension apparatus 100 in its in-use configuration utilizing the components of FIG. 1 without the appliance unit 600 and the suspension element 401. As shown in FIG. 2, the upper fasteners 302 and the frame connector 301 may be removed from the upper support bracket sleeves 111 of the suspension apparatus 100 for storage and/or transport of the suspension apparatus 100. As will be discussed in more detail with reference to FIG. 3, the suspension apparatus 100 may be modified for storage and/or transport such that a distance between the first support frame 101 and the second support frame 102 is smaller than the distance in the in-use configuration of the suspension apparatus 100.

Figure 3:
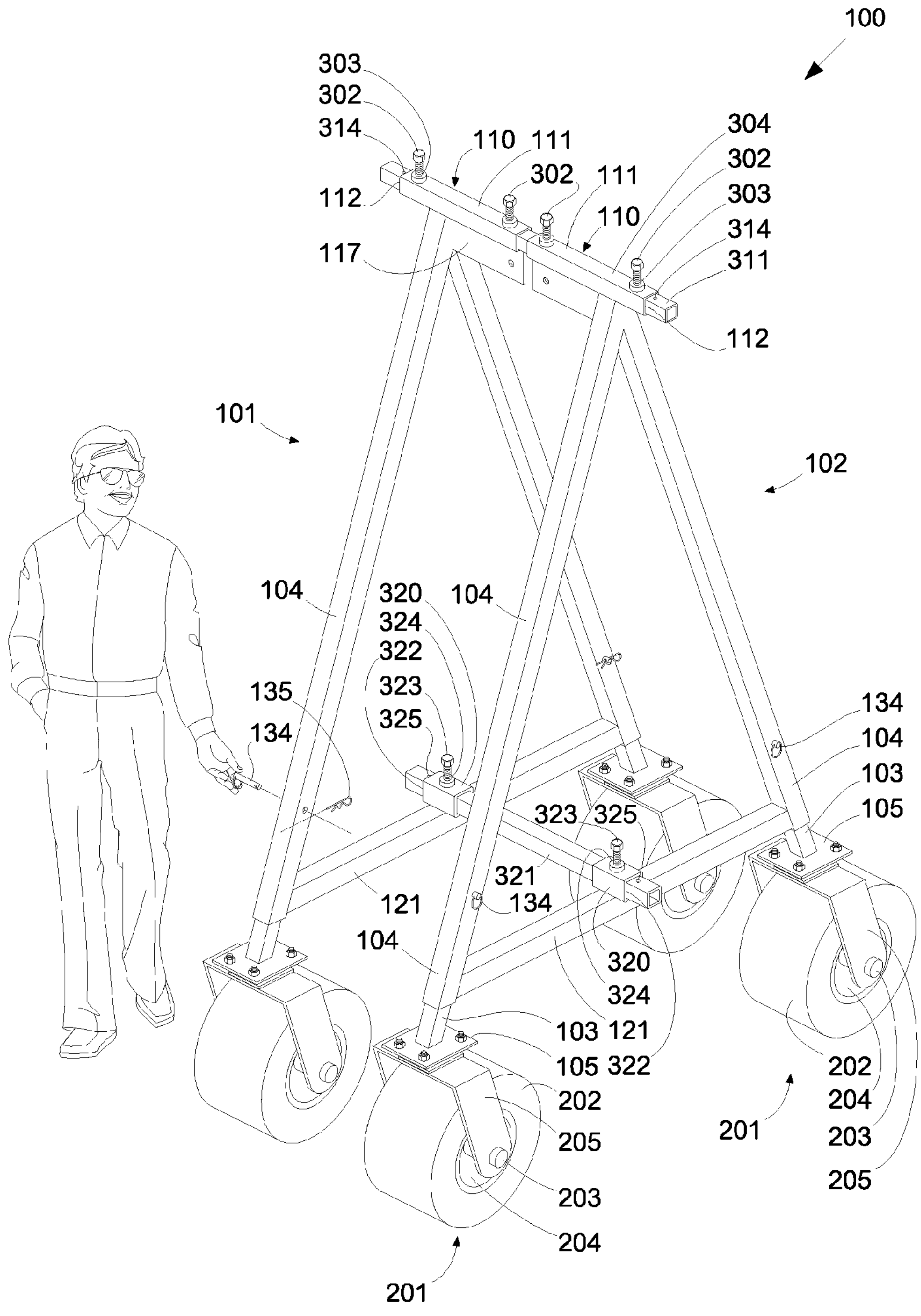
FIG. 3 is a perspective view of the apparatus of FIG. 1 in its stored or transported configuration in accordance with various embodiments of the present disclosure.

Moving on to FIG. 3, shown is a drawing of an example of the suspension apparatus 100 modified for storage and/or transport. As illustrated in FIG. 3, an upper retention connector 311 may be coupled to the upper support bracket assembly 110 of the first support frame 101 and the second support frame 102 to maintain the connection between the first support frame 101 and the second support frame 102 for storage and transport of the suspension apparatus 100. Although the upper retention connector 311 is shown as a bar in FIG. 3, the upper retention connector 311 may comprise a plate, a bar, a rod, a pipe, and/or other type of appropriate connecting means. To allow for compact storage, the length of the upper retention connector 311 is less than the length of the frame connector 301.

In some embodiments, a first end of the upper retention connector 311 may be inserted into the upper support bracket sleeve 111 of the first support frame 101 and the second end of the upper retention connector 311 may be inserted into the upper support bracket sleeve 111 of the second support frame 102. The upper retention connector 311 may be secured to the first support frame 101 and the second support frame 102 by upper fasteners 302. For example, the upper retention connector 311 may be secured to the first support frame 101 and the second support frame by the upper fasteners 302 that are inserted through the upper holes 303 in a top face of upper support bracket assembly 110 and engaged with the upper retention fastener receptacle ports 314 on the top face of the upper retention connector 311 to prevent the upper retention connector 311 from moving laterally during storage and/or transport of the suspension apparatus 100.

With further reference to FIG. 3, for storage and/or transport of the suspension apparatus 100, a lower retention connector 321 may be coupled to the base post 121 of the tube frame 120 of the first support frame 101 and the base post 121 of the tube frame 120 of the second support frame 102. Although the lower retention connector 321 is shown as a bar in FIG. 3, the lower retention connector 321 may comprise a plate, a bar, a rod, a pipe, and/or other type of appropriate connecting means. To allow for compact storage, the length of the lower retention connector 321 is less than the length of the frame connector 301.

In some embodiments, the lower retention connector 321 may be inserted into a lower retention connector sleeve 320 on a top face of the base post 121 of each the first support frame 101 and the second support frame 102 by inserting one of each end of the lower retention connector 321 through each lower retention connector sleeve 320. The lower retention connector 321 may extend through a lower distal opening 322 of one or both of the lower retention connector sleeves 320. The lower retention connector 321 is secured to the first support frame 101 and the second support frame 102. For example, the lower retention connector 321 may be secured within each lower retention connector sleeve 320 by lower fasteners 323, such as, for example, screw type fasteners. The lower fasteners 323 may insert through a lower hole 324 in top face of each of the lower retention connector sleeves 320 and engage lower retention fastener receptacle ports 325 on a top face of each lower retention connector 321 to prevent the lower retention connector 321 from moving laterally during storage or transport of the apparatus.

For expansion and use of suspension apparatus 100, the upper retention connector 311 and the lower retention connector 321 may be removed from the suspension apparatus 100 by removing the upper fasteners 302 and/or lower fasteners 323 and removing the upper retention connector 311 and the lower retention connector 321, respectively.

It should be noted that while FIG. 3 illustrates using the upper retention connector 311 to connect an upper portion of the first support frame 101 to an upper portion of the second support frame 102 for transport and/or storage. The frame connector 301, rather than the retention connector 311, may also be used for storage and/or transport. Accordingly, the upper fasteners 302 may be removed and the distance between the first support frame and the second support frame may be adjusted by moving the first support frame 101 and/or the second support frame 102 closer to one another until a desired distance is reached for storage and/or transport. When a desired distance is achieved, the upper fasteners 302 may be used to secure the frame connector 301 to the first support frame 101 and the second support frame 102.

Figure 4:
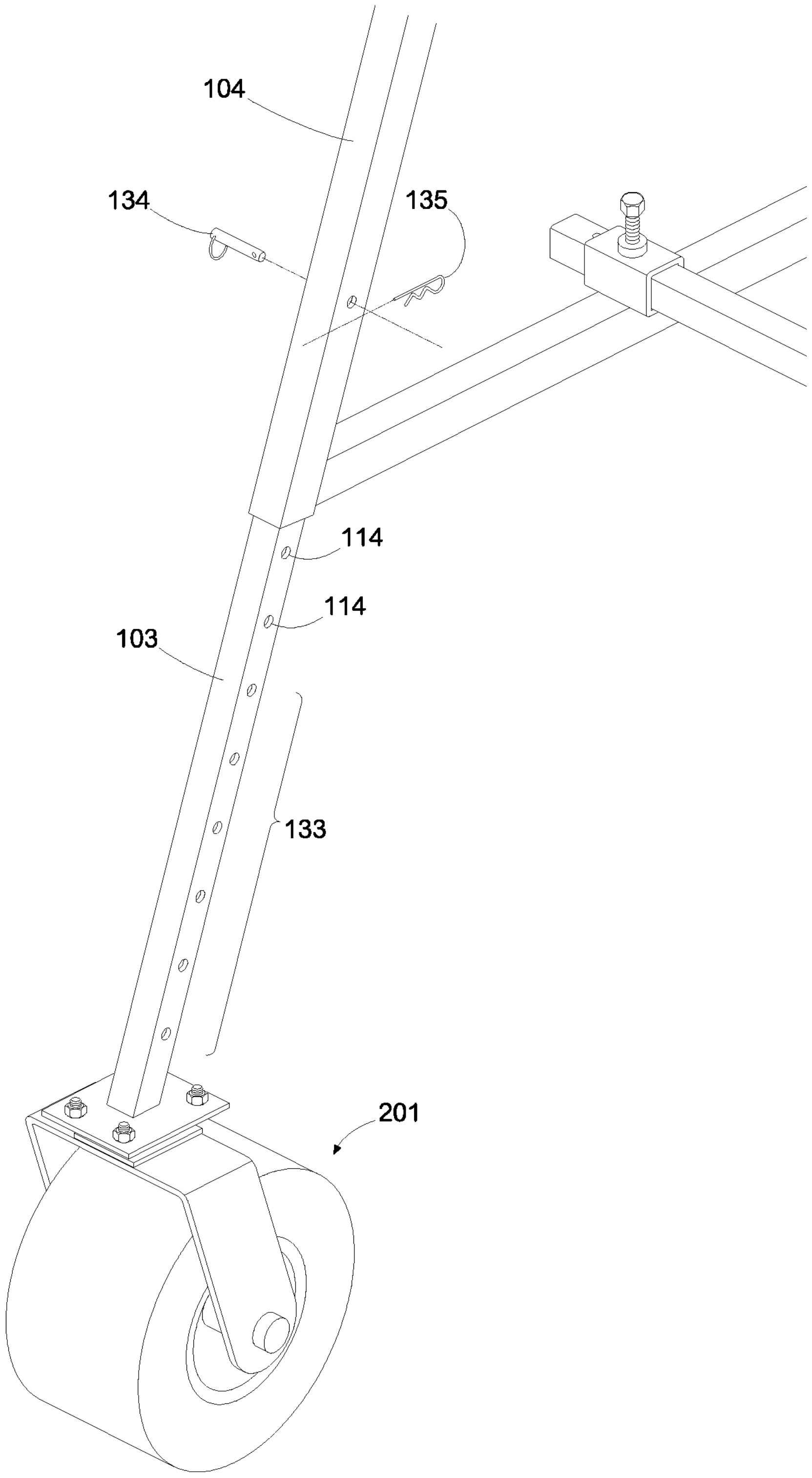
FIG. 4 is a perspective view of an exemplary telescopic leg of the apparatus of FIG. 1 in accordance with various embodiments of the present disclosure.

Referring next to FIG. 4, the telescopic legs 103 comprise two sets of opposing, integrated pin receptacle ports 114 along the length of the telescopic legs 103 at fixed intervals 133 for adjustment of the height of the suspension apparatus 100. The telescopic legs 103 may be secured at the desired height by insertion of leg fasteners 134, which may comprise, for example, bolt-and-cotter pins 135 and/or other type of appropriate fastening devices. The height of the suspension apparatus 100 may be adjusted by removing the leg fasteners 134, adjusting the telescopic leg 103 heights, and re-inserting the leg fasteners 134 when suspension apparatus 100 is at desired height. As previously stated, the extendable legs may be about seven feet in length.

With reference to the examples illustrated in FIGS. 1-4, it is understood that in various embodiments, the tube frame 120, the telescopic legs 103, the upper support bracket sleeves 111, the frame connector 301, and the upper retention connector 311 and the lower retention connector 321 may comprise of 3⁄16", 1⁄4", or other dimensions as can be understood of thick steel or aluminum tubing or other shape. In addition, in various embodiments, the suspension apparatus 100 may be configured to support an appliance unit 600 having a weight up to 3500 pounds or other weight.

Figure 5:
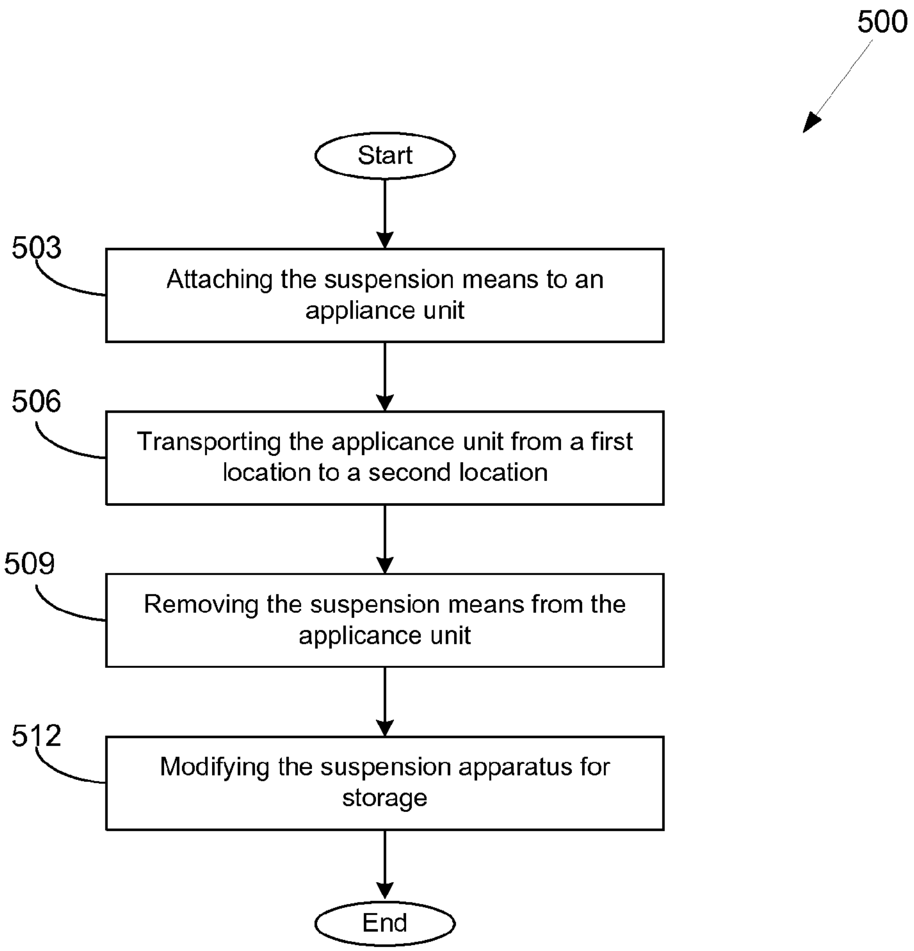
FIG. 5 is a flow diagram illustrating an example of the use of the apparatus of FIG. 1, in accordance with various embodiments of the present disclosure.

Referring next to FIG. 5, shown is a flowchart 500 illustrating an example of a method for transporting an appliance unit 600 (FIG. 1). Beginning with reference numeral 503, the suspension element 401 (FIG. 1) is attached to the appliance unit 600 to secure the appliance unit 600 to the suspension apparatus 100 (FIG. 1) for transportation from a first location to a second location. For example, the suspension apparatus 100 may be used to lift appliance units 600 that are placed at the edge of a building roof by a crane by securing the appliance unit 600 within the suspension element 401, by using, for example, a harness configuration or by attaching the suspension element 401 to or through lift ports on the appliance unit 600 or unit frame 601 (FIG. 1). At reference numeral 506, the appliance unit 600 is transported from the first location to the second location. For example, the suspension apparatus 100 containing the appliance unit 600 may be rolled across the building roof to the installation site, where the appliance unit 600 can be lowered from the suspension apparatus 100 at the desired site and to the desired unit height. Similarly, the suspension apparatus 100 may be used to lift existing commercial or industrial appliance units 600 from, for example, HVAC roof curbing for removal of the unit 600 by attaching suspension element 401 to the appliance unit 600 or unit frame 601, lifting the unit 600, and rolling the suspension apparatus 100 containing the appliance unit 600 to the edge of the building roof where it can then be lowered and detached from the suspension apparatus 100 for removal from the building roof by a crane or other heavy lifting device, vehicle or mechanism.

At reference numeral 509, the suspension element 401 is removed from the appliance unit 600. Accordingly, when the appliance unit 600 is at the desired site for installation and/or removal, the suspension element 401 may be adjusted to lower the appliance unit 600. Once the appliance unit 600 is lowered, the suspension element 401 may be removed from the appliance unit 600.

At reference numeral 512, the suspension apparatus 100 may be modified for storage and/or transport. The suspension apparatus 100 may be modified for storage and/or transportation by removing the suspension element 401 connected to the first support frame 101 (FIG. 1) and the second support frame 102 (FIG. 1). In addition, the frame connector 301 (FIG. 1) may be removed from the suspension apparatus 100 by unfastening and removing the upper fasteners 302 (FIG. 1) securing the frame connector 301 to the first support frame 101 and the second support frame 102. When the frame connector 301 is removed, an upper retention connector 311 (FIG. 3) may be used to replace the frame connector 301. As previously discussed, the upper retention connector 311 may be smaller in length than the frame connector 301. Accordingly, the first support frame 101 and the second support frame 102 may be moved closer to each other so that the upper retention connector 311 may be used to connect the first support frame 101 to the second support frame 102. Similar to the frame connector 301, the upper retention connector 311 may be mounted to the first support frame 101 and the second support frame 102 via the upper fasteners 302 to prevent the upper retention connector 311 from moving laterally during storage or transport of the suspension apparatus 100.

In addition, the suspension apparatus 100 may be further modified for storage and transport, by attaching a lower retention connector 321 (FIG. 3) to the base posts 121 (FIG. 1) of the first support frame 101 and the second support frame 102. For example, the lower retention connector 321 may be inserted into a lower retention connector sleeve 320 (FIG. 3) on top face of the base post 121 of the first support frame 101 and the second support frame 102 by inserting one of each end of the lower retention connector 321 through the lower retention connector sleeves 320 and extending through each lower distal opening 322 (FIG. 3) of the lower retention connector sleeves 320. The lower retention connector 321 may be secured to the first support frame 101 and the second support frame 102 via lower fasteners 323 to prevent the lower retention connector 321 from moving laterally during storage or transport of the suspension apparatus 100. The lower retention connector 321 may be similar in length to the upper retention connector 311.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system for transporting commercial and industrial appliance units, comprising:

a suspension apparatus that is manually-movable comprising a first A-frame and a second A-frame configured for assembly to transport an appliance unit by coupling the first A-frame and the second A-frame using a single frame connecting member;

wherein the first A-frame comprises:

a first lateral support post that receives a first telescopic leg at a bottom of the first A-frame, the first telescopic leg being coupled to a first wheel base plate;

a second lateral support post that receives a second telescopic leg at the bottom of the first A-frame, the second telescopic leg being coupled to a second wheel base plate; and a first upper support bracket assembly, the first upper support bracket assembly comprising:

a first bracket sleeve receiving a first end of the single frame connecting member; and a first upper support bracket disposed below the first bracket sleeve receiving a first hanging connection of a suspension element at a first portal;

wherein the second A-frame comprises:

a second upper support bracket assembly, the second upper support bracket assembly comprising:

a third lateral support post that receives a third telescopic leg at the bottom of the second A-frame, the third telescopic leg being coupled to a third wheel base plate;

a fourth lateral support post that receives a fourth telescopic leg at the bottom of the second A-frame, the fourth telescopic leg being coupled to a fourth wheel base plate;

a second bracket sleeve receiving a second end of the single frame connecting member; and a second upper support bracket disposed below the second bracket sleeve receiving a second hanging connection of the suspension element at a second portal;

wherein the single frame connecting member horizontally extends between a top distal end of each of the first A-frame and the second A-frame and is received in the first bracket sleeve and the second bracket sleeve, wherein a width of the suspension apparatus is capable of manual adjustment based on an amount of the single frame connecting member being received in the first bracket sleeve and the second bracket sleeve;

wherein the suspension element is detachably attached to the first upper support bracket and the second upper support bracket; and wherein the suspension apparatus is configured to suspend the appliance unit on at least two horizontally extending portions of the suspension element and situate the appliance unit between a first vertically extending portion and a second vertically extending portion of the suspension element.

2. The system of claim 1, wherein the first upper support bracket further comprises a first support plate and the second upper support bracket further comprises a second support plate, and wherein the suspension element is attached to the first support plate and the second support plate.

3. The system of claim 1, further comprising:

a first plurality of wheel assemblies detachably attached to the first A-frame; and a second plurality of wheel assemblies detachably attached to the second A-frame.

4. The system of claim 3, wherein the first plurality of wheel assemblies are detachably attached to the first A-frame via the first base plate and the second base plate that are affixed to the first A-frame at the third telescopic leg and at the fourth telescopic leg; and wherein the second plurality of wheel assemblies are detachably attached to the second A-frame via the third base plate and the fourth base plate that are affixed to the A-frame at the third telescopic leg and at the fourth telescopic leg.

5. The system of claim 1, wherein the suspension element is configured to manually lower or raise the appliance unit about the suspension apparatus.

6. The system of claim 1, wherein the appliance unit that is suspended from the suspension apparatus is supported at a front of the appliance unit by the suspension element and at a back of the appliance unit by the suspension element.

7. The system of claim 1, wherein the suspension element comprises at least one of a chain, a cable sling, a nylon sling, or a come-along device.

8. The system of claim 1, wherein a first one of the at least two horizontally extending portions of the suspension element is positioned to support a first distal end of the appliance unit and a second one of the at least two horizontally extending portions of the suspension element is positioned to support a second distal end of the appliance unit.

9. The system of claim 1, wherein the suspension apparatus is configured to suspend the appliance unit having a weight of approximately 3500 pounds.

10. The system of claim 1, wherein the single frame connecting member has a width of approximately 8 feet to 20 feet.

11. The system of claim 1, wherein the single frame connecting member protrudes from an opening in at least one of: the first bracket sleeve or the second bracket sleeve.

12. The system of claim 1, further comprising a plurality of upper fasteners inserted through a plurality of upper holes located in a top face of the upper support bracket assembly that engage a plurality of frame fastener receptacle ports on a top face of the single frame connecting member to prevent the single frame connecting member from moving laterally during operation of the suspension apparatus.

13. The system of claim 1, further comprising a lower retention connector sleeve positioned on a top face of a base post of each of the first A-frame and the second A-frame.

14. The system of claim 13, further comprising a lower retention connector positioned in the lower retention connector of each of the first A-frame and the second A-frame.

15. A method for lifting, suspending, transporting, and lowering an appliance unit, comprising:

providing a suspension apparatus that is manually-movable comprising a first A-frame and a second A-frame configured for assembly to transport the appliance unit by coupling the first A-frame and the second A-frame using a single frame connecting member, wherein the first A-frame comprises:

a first lateral support post that receives a first telescopic leg at a bottom of the first A-frame, the first telescopic leg being coupled to a first wheel base plate;

a second lateral support post that receives a second telescopic leg at the bottom of the first A-frame, the second telescopic leg being coupled to a second wheel base plate; and a first upper support bracket assembly, the first upper support bracket assembly comprising:

a first bracket sleeve receiving a first end of the single frame connecting member; and a first upper support bracket disposed below the first bracket sleeve receiving a first hanging connection of a suspension element at a first portal;

wherein the second A-frame comprises:

a second upper support bracket assembly, the second upper support bracket assembly comprising:

a third lateral support post that receives a third telescopic leg at the bottom of the second A-frame, the third telescopic leg being coupled to a third wheel base plate;

a fourth lateral support post that receives a fourth telescopic leg at the bottom of the second A-frame, the fourth telescopic leg being coupled to a fourth wheel base plate;

a second bracket sleeve receiving a second end of the single frame connecting member; and a second upper support bracket disposed below the second bracket sleeve receiving a second hanging connection of the suspension element at a second portal;

wherein the single frame connecting member horizontally extends between a top distal end of each of the first A-frame and the second A-frame and is received in the first bracket sleeve and the second bracket sleeve, wherein a width of the suspension apparatus is capable of manual adjustment based on an amount of the single frame connecting member being received in the first bracket sleeve and the second bracket sleeve;

wherein the suspension element is detachably attached to the first upper support bracket and the second upper support bracket;

wherein the suspension apparatus is configured to suspend the appliance unit on at least two horizontally extending portions of the suspension element and situate the appliance unit between a first vertically extending portion and a second vertically extending portion of the suspension element;

manually suspending the appliance unit from the suspension apparatus using the suspension element;

manually transporting the appliance unit from a first location to a second location while the appliance unit is suspended;

manually lowering the appliance unit from the suspension apparatus;

manually removing the suspension element from the appliance unit; and manually modifying the suspension apparatus for storage.

16. The method of claim 15, wherein modifying the suspension apparatus for storage comprises replacing the single frame connecting member with a retention connector, a frame connecting member length for the single frame connecting member being greater than a retention connector length for the retention connector.

17. The method of claim 15, wherein suspending the appliance unit from the suspension apparatus using the suspension element comprises suspending the appliance unit having a weight of approximately 3500 pounds.

18. The method of claim 15, wherein the suspension element comprises at least one of a chain, a cable sling, a nylon sling, or a come-along device.

19. The method of claim 15, further comprising adjusting a width of the suspension apparatus by adjusting an amount of the single frame connecting member positioned in the sleeve located at the distal end of the first A-frame or the second A-frame.

20. The method of claim 15, further comprising replacing the single frame connecting member with another single frame connecting member having a different length to adjust a width of the suspension apparatus.

* * * * *